(12) United States Patent
Powell et al.

(10) Patent No.: US 7,497,476 B2
(45) Date of Patent: Mar. 3, 2009

(54) POSITIVE LOCKING CONNECTOR FOR VEHICLE COMPONENT

(75) Inventors: Jeffrey J. Powell, Belle River (CA); Stephen E. Brackett, Clarkston, MI (US)

(73) Assignee: Mahle Technology, Inc., Farmington Hills, MI (US)

( * ) Notice: Subject to any disclaimer, the term of this patent is extended or adjusted under 35 U.S.C. 154(b) by 775 days.

(21) Appl. No.: 10/392,418

(22) Filed: Mar. 19, 2003

(65) Prior Publication Data
US 2003/0198507 A1 Oct. 23, 2003

Related U.S. Application Data

(60) Provisional application No. 60/374,399, filed on Apr. 22, 2002.

(51) Int. Cl.
*F16L 55/00* (2006.01)
(52) U.S. Cl. .......................... 285/81; 285/242; 285/401
(58) Field of Classification Search ................. 285/241, 285/242, 245, 376, 401, 402, 81; 403/34, 403/36, 39, 348, 349
See application file for complete search history.

(56) References Cited

U.S. PATENT DOCUMENTS

| 2,421,228 A | * | 5/1947 | White ......................... 285/110 |
| 5,168,856 A | | 12/1992 | Lorraine |
| 5,284,368 A | * | 2/1994 | Oetiker et al. .................. 285/81 |

* cited by examiner

*Primary Examiner*—Daniel P. Stodola
*Assistant Examiner*—Victor MacArthur
(74) *Attorney, Agent, or Firm*—Carlson, Gaskey & Olds, PC

(57) ABSTRACT

A vehicle connector assembly includes a positive lock feature that allows a hose to be quickly and easily attached to a vehicle component such as an intake manifold or air induction component. The component includes a projection that extends outwardly from a main body to a distal end. A locking cap is installed over the projection and cooperates with an alignment feature on the projection such that the cap does not separate from the projection prior to installation of the hose. An end of the hose is slidably installed within the locking cap and over the projection. The locking cap is then rotated from an unlocked position to a locked position to prevent linear movement of the hose relative to the projection. The locking cap is made from a resilient material and provides a serviceable connection.

8 Claims, 2 Drawing Sheets

POSITIVE LOCKING CONNECTOR FOR VEHICLE COMPONENT

CROSS-REFERENCE TO RELATED APPLICATIONS

The application claims priority to U.S. Provisional Application No. 60/374,399, which was filed on Apr. 22, 2002.

BACKGROUND OF THE INVENTION

This invention relates to a vehicle connector assembly that includes a locking member that aligns and locks a hose end to a vehicle component.

Hoses are installed onto vehicle components such as an intake manifold, air induction, brake booster, and/or emission component. Typically, these vehicle components include nipples that extend outwardly from a main body of the component to a distal end. An end of the hose is slidably received over the distal end to engage the nipple in an interference fit to connect the hose to the component.

The hose and nipple connection must remain secure throughout the life of the vehicle. In certain applications, such as for a brake booster connection or emission connection, the connection must meet safety and emission requirements. A retention feature is included on the nipple to ensure that the hose end does not become disengaged from the nipple.

This retention feature typically comprises a plurality of barbs that are integrally formed on the nipple by use of an injection molding process. As the end of the hose is slid over the nipple, the barbs grip and retain the hose to the vehicle component.

Certain safety applications require barbs on the nipple to increase the pull-off strength required to separate the hose from the component after installation. Due to the complexity of certain vehicle components, requiring barbs to be added to the nipples increases the complexity and cost of the injection molding tooling.

Also, the injection mold tooling that is used to form the barbs can wear over time, resulting in a softened barb profile. In other words, due to tool wear, the barbs are not as sharp as they should be. This decreases the retention force connection between the nipple and the hose and can result in hose separation. For example, during vehicle operation, the hoses are subject to vibrations and can be shaken loose due to the reduced retention force. Or, if the vehicle is being serviced, a technician may bump or knock the hose loose due to the reduced retention force.

Another disadvantage with the barb retention feature is the potential for increased leakage. If the barbs are formed near the insertion end of the nipple, an increased installation load is required, which can tear or gouge the inner surface of the hose, creating a potential leak path. Further, if a sufficient installation load is not applied then the hose may not achieve an adequate engagement length, which also increases leak potential.

The potential for leaking is also increased by the injection molding process itself. Some nipples are formed by two halves of the injection mold tool. This results in the formation of a parting line on the nipple. After installation, the parting line provides a potential leak path.

Thus, it is desirable to have a vehicle connector assembly for a hose end that does not require a barb retention feature and which provides a quick and easy connection, as well as overcoming the other above mentioned deficiencies with the prior art.

SUMMARY OF THE INVENTION

A connector assembly is used to interconnect first and second vehicle components with a serviceable connection. The first vehicle component includes a main body with at least one transversely extending projection that defines a longitudinal axis. The second vehicle component includes a longitudinally extending bore that is received over the projection to define an overlap connection portion. A retention member substantially surrounds the overlap connection portion. The retention member engages the second vehicle component and is movable between an unlocked position where linear movement of the second vehicle component relative to the first vehicle component along the longitudinal axis is permitted and a locked position where linear movement of the second vehicle component relative to the first vehicle component along the longitudinal axis is prohibited.

In one disclosed embodiment, the connector assembly is used to interconnect a hose end to a vehicle component such as an intake manifold induction component or other similar component. Preferably, the retention member is a locking cap that is made from a resilient or flexible material such as glass filled nylon. The locking cap is compressed and slid over the projection prior to the hose being installed onto the projection. The locking cap is then released so that it assumes its original configuration. Once the cap has returned to its original configuration, the locking cap cooperates with alignment features formed on the projection to keep the locking cap from separating from the projection prior to installation of the hose end. The hose end is inserted between the locking cap and the projection. The locking cap is then rotated from an unlocked position to a locked position to prevent linear movement of the hose relative to the projection. If service is required, the locking cap can be rotated back to the unlocked position so that the hose end can be disengaged from the projection.

The locking cap preferably includes an outer surface and an inner surface that defines a central bore. At an insertion end of the central bore, a ramp is formed to provide a longitudinal force against the hose during installation of the hose onto the nipple while also providing a longitudinal force against the hose after the locking cap has been rotated to the locked position.

The locking cap also includes a pair of angled slots that cooperate with posts formed on the projection. The locking cap is compressed from an initial circular shape to a generally oval shape so that the cap clears the posts during installation of the cap onto the projection. The slots are aligned with the posts and then the cap is released to resume the original circular shape. Once the original shape is assumed, the posts are received within the slots and the locking cap has a floating attachment to the projection. The hose is then inserted between the cap and the projection. As the cap is rotated, the posts, slots, and ramp cooperate to draw the hose further along the projection until the cap is placed in the locked position.

The subject connector assembly provides a simplified, strong, and serviceable hose connection for a vehicle component. These and other features of the present invention can be best understood from the following specifications and drawings, the following of which is a brief description.

DETAILED DESCRIPTION OF A PREFERRED EMBODIMENT

Figure 1:
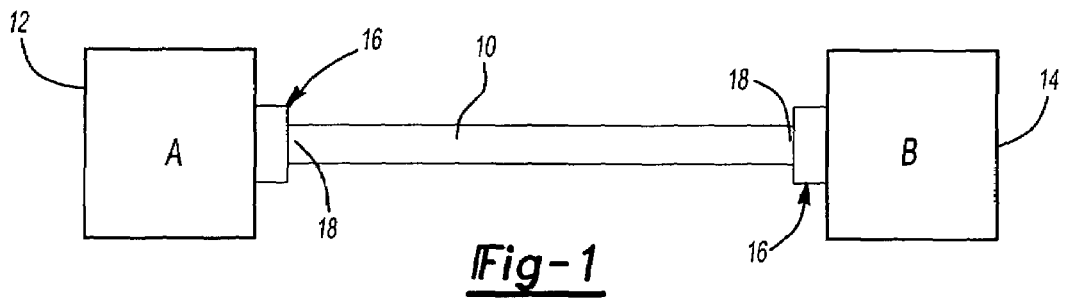
FIG. 1 is a schematic diagram of two vehicle components interconnected to each other with a hose and connector assembly incorporating the subject invention.

A hose 10 is used to interconnect a first vehicle component 12 to a second vehicle component 14. A positive locking connector assembly, shown generally at 16, is used to securely align, attach, and lock each hose end 18 to the respective first 12 and second 14 vehicle components. The connector assembly 16 is movable between an unlocked position where the hose end 18 can be removed from the vehicle component 12, 14 and a locked position where the hose end 18 is prevented from being removed from the vehicle component 12, 14, thus providing a serviceable connection.

Any type of vehicle component requiring a hose connection can utilize this unique positive locking connector assembly 16. The hose 10 provides fluid communication between various vehicle systems and can be configured to conduct air, hydraulic fluid, brake fluid, emission gases, etc. Thus, emission components, brake components, air induction components, intake manifold components, fuel components, etc., which require hose attachments can utilize the subject connector assembly 16.

Figure 2:
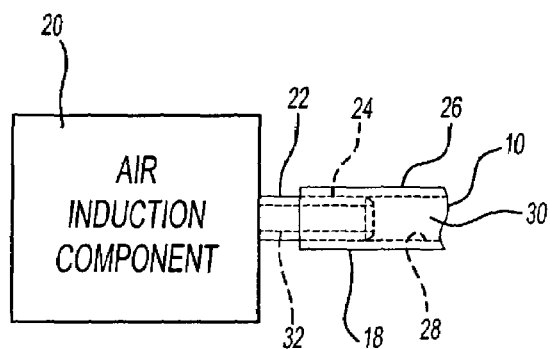
FIG. 2 is a schematic diagram of the area indicated in FIG. 1.
Figure 3:
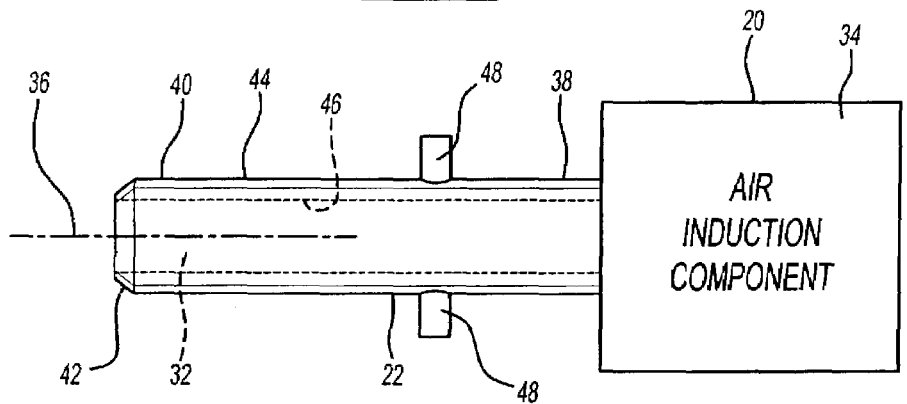
FIG. 3 is a side view, partially cut-away, of an attachment projection extending outwardly from a vehicle component.

As shown in FIG. 2, an air induction component 20 includes a transversely extending nipple or projection 22. The hose end 18 is slidably received over the projection 22 to define an overlap portion 24. The hose 10 has an outer surface 26 and an inner surface 28 that defines a hose bore 30, which forms a fluid path through the hose 10. The projection 22 includes a longitudinally extending bore 32 that is in fluid communication with the hose bore 30 so that fluid, i.e. air, can be conducted from the hose 10 into the air induction component 20.

The air induction component 20 includes a main body portion 34 with the projection 22 extending out from the main body portion 34 to define a longitudinal axis 36. The projection 22 is preferably formed integrally with the main body portion 34 of the air induction component 20 as a single piece. The projection 22 is preferably made from a composite material, however, other materials known in the art could also be used.

The projection 22 includes a base end 38 at the main body portion 34 and extends to a distal or insertion end 40 that has a tapered tip 42. The tapered tip 42 facilitates insertion of the hose end 18 onto the projection 22. The projection 22 includes an outer surface 44 and an inner surface 46 that defines the longitudinally extending bore 32. The longitudinally extending bore 32 communicates with an interior portion of the main body portion 34 at the base end 38 and communicates with the hose bore 30 at the distal end 40.

Figure 4:
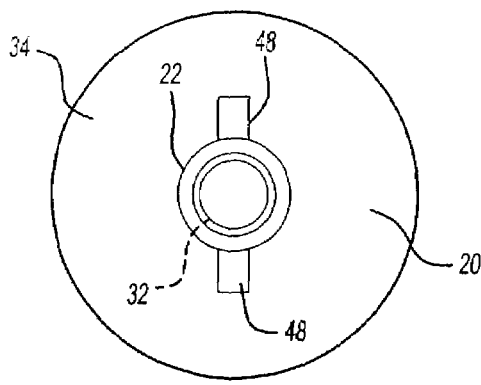
FIG. 4 is an end view of the projection of FIG. 3.

A pair of pins or posts 48 extends out radially from the projection 22 adjacent to the base end 38. The posts 48 extend transversely to the longitudinal axis 36 and are preferably perpendicular to the axis 36. The posts 48 extend out from the projection 22 in opposing directions from each other, as shown in FIG. 4. While a pair of posts 48 are preferred, it should be understood that additional posts 48 could be formed on the projection 22 or only one post 48 could be needed, depending upon the type of vehicle component.

Figure 5:
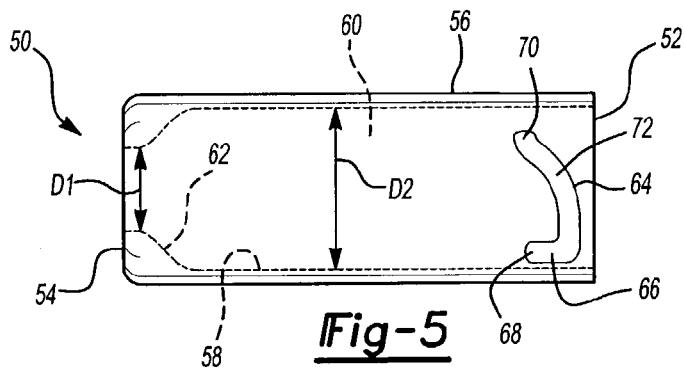
FIG. 5 is a side view of a retention member.

The connector assembly 16 includes a retention member or locking cap 50, shown in FIG. 5, that cooperates with the projection 22 and hose end 18 to lock the hose 10 to the induction component 20. The locking cap 50 includes a first end 52, which when installed over the projection 22 is adjacent to the main body portion 34, and a second end 54, which when installed is adjacent to the distal end 40 of the projection.

The locking cap 50 includes an outer surface 56 and an inner surface 58 that defines a central cap bore 60 that extends from the first end 52 to the second end 54. Preferably, the central cap bore 60 is generally circular. The inner surface 58 is defined by a variable diameter such that the first end 52 has a larger diameter than the second end 54. Further, the cap bore 60 includes a ramped portion 62 that is formed at the second end 54. The ramped portion 62 extends from a minimum diameter D1 at the second end 54 to the maximum diameter D2 at the first end 52. As shown in FIG. 5, a significant portion of the cap bore 60 is defined at the maximum diameter with the ramped portion 62 only extending over a small portion of the second end 54.

The locking cap 50 includes a pair of locking ramps or slots 64 (only one is shown in FIG. 5) that cooperate with the posts 48 to provide alignment and locking retention. This relationship will be described in further detail below. There is one slot 64 for every post 48. Each slot 64 includes a first slot end 66 having a retaining recess 68 in which the post 48 sits during an initial installation position, which corresponds to an unlocked position. Each slot 64 includes a second slot end 70 that receives the post 48 once the locking cap 50 is moved to the locked position. A slot path 72 formed between the first 66 and second 70 slot ends extends both laterally and longitudinally along the locking cap 50, such that as the locking cap 50 is rotated about the longitudinal axis 36, the cap 50 simultaneously moves in a linear direction parallel to the longitudinal axis such that each post 48 moves from the retaining recess 68 at the first slot end 66 to the second slot end 70 to place the connector assembly 16 in the locked position.

The locking cap 50 is preferably made from a strong resilient material such that the cap can be easily installed over the projection 22. Preferably, the locking cap 50 is molded with a glass filled nylon material so that it is strong and flexible. While glass filled nylon is preferred, it should be understood that other similar materials known in the art could also be used.

The locking cap 50 and hose end 18 are assembled onto the projection 22 in the following manner. As the locking cap 50 is formed from a resilient material, the locking cap 50 is first compressed from its initial circular shape to achieve a generally oval shape. The locking cap 50 is then inserted over the projection 22 via the first end 52. The oval shape allows the posts 48 on the projection 22 to clear the inner surface 58 of the locking cap 50. As the locking cap is being inserted over the projection 22, the slots 64 are aligned with the posts 48. The compressing pressure is then released from the locking cap 50, allowing the cap 50 to return to its initial circular shape. The posts 48 cooperate with the slots 64 to retain and align the cap 50 on the projection 22.

Figure 6:
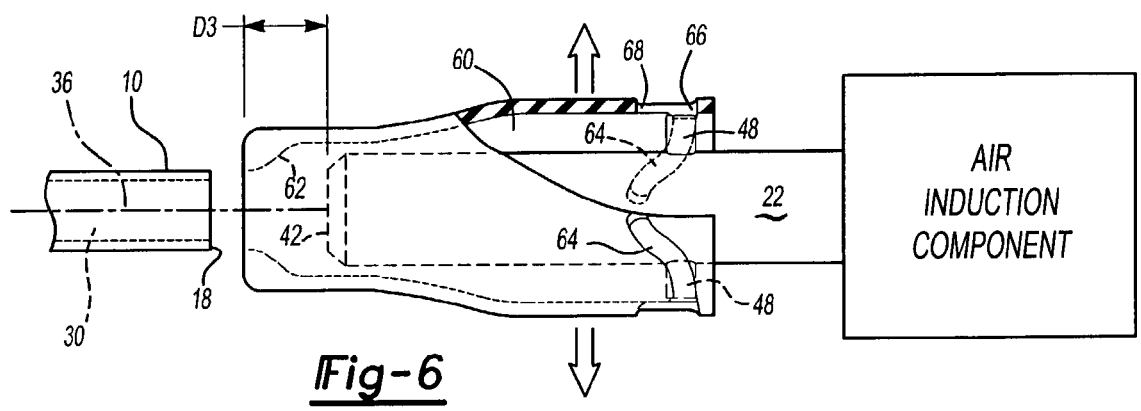
FIG. 6 is a partial exploded view with the retention member in an initial assembled position on the projection, prior to insertion of the hose.
Figure 7:
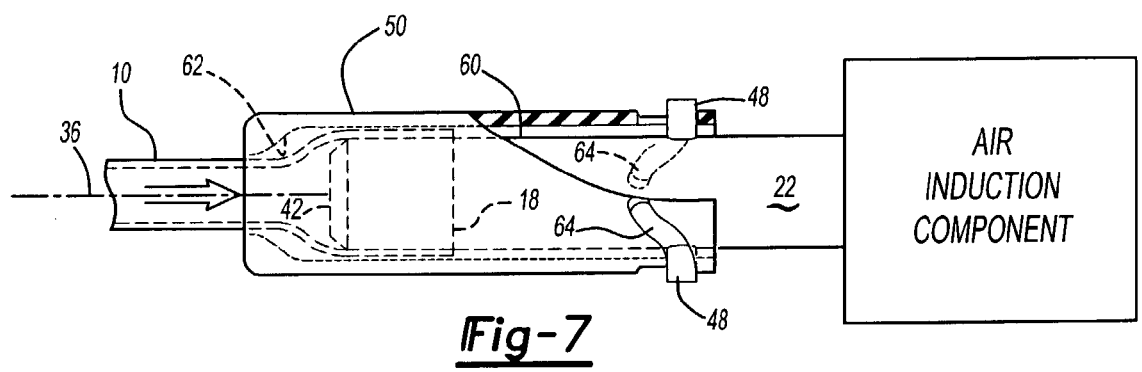
FIG. 7 is a side view showing the hose being inserted over the projection and under the retention member with the retention member in an unlocked position.

As shown in FIG. 6, the locking cap 50 is orientated on the posts 48 such that a distance D3 from the tapered tip 42 of the projection 22 to the beginning of the ramped portion 62 at the hose insertion end (second end 54 of the cap 50) is sufficient to allow the hose end 18 to be installed over the distal end 40 of the projection 22. Further, the diameter D2 of the cap bore 60 is large enough to provide sufficient clearance as the hose 10 is installed onto the projection 22. Because the cap 50 is installed on die projection 22 prior to insertion of the hose 10, this clearance in combination with the slots 64 and posts 48 provide a floating connection. Once the cap 50 has been properly orientated, the hose end 18 is then inserted over the projection 22, as shown in FIG. 7. Thus, the hose end 18 is inserted between the inner surface 58 of the locking cap 50 and the outer surface 44 of the projection 22 such that the inner surface 28 of the hose 10 grips directly against the outer surface 44 of the projection 22.

Figure 8:
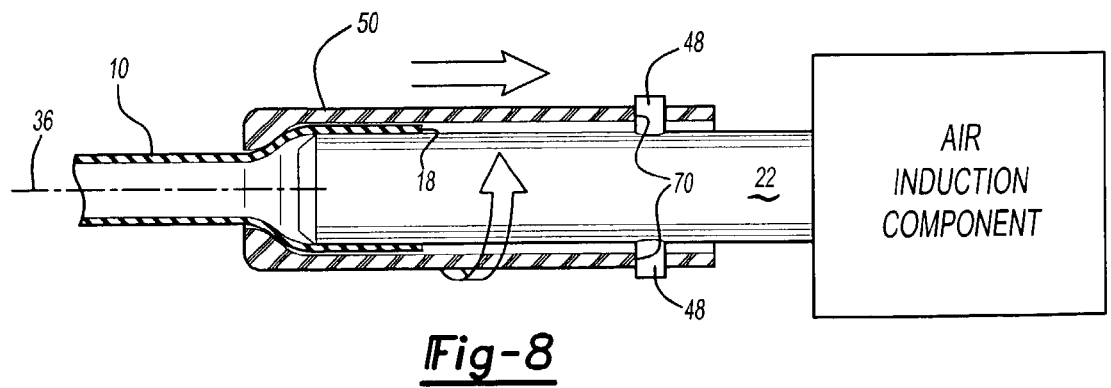
FIG. 8 is a side view showing the hose an retention member in a fully installed, locked position.

Also, as shown in FIG. 7, once the hose end 18 is inserted into the cap 50 and over the projection 22, the ramped portion 62 applies a generally linear, longitudinal force against the outer surface 26 of the hose 10. The cap 50 is then rotated, as indicated by the arrows, from the initial unlocked position where the posts 48 are positioned at the first slot end 66 to the locked position, shown in FIG. 8, where the posts 48 are positioned at the second slot end 70. The rotation of the cap 50 causes the cap 50 to simultaneously move in a linear direction along the longitudinal axis 36 due to the angled orientation of the ramped portion 62 and the resultant forces exerted on the posts 48.

As the cap 50 moves along the linear path, a longitudinal force is exerted against the hose 10 to ensure that complete engagement occurs between the hose 10 and projection 22. The geometry of the ramped portion 62 allows sufficient linear movement of the cap 50 along the projection 22 to properly assembly the hose into the cap bore 60 while ensuring full and complete engagement with the projection 22 to achieve a leak-free connection.

As discussed above, the locking cap 50 can selectively be rotated between the locked and unlocked positions. The locked position prevents the hose end from moving relative to the projection 22 to provide a tight and secure connection. However, once locked, the locking cap 50 can subsequently be rotated back to the unlocked position. Once the cap 50 has been placed in the unlocked position, the hose end 18 can be slid off of the projection without damaging any of the components so that service operations can be performed. Once service has been completed, the hose end 18 can be reinserted over the projection 22 and the locking cap 50 can be rotated back to the locked position.

The projection 22 is preferably formed on the air induction component 20 by a straight die pull, either by a slide, or by core, or by cavity steel, for a portion of the length of the base end 38 of the projection 22. This length is preferably at least one diameter of the projection 22. Then, the posts 48 are molded near the base end 38 by slides. The posts 48 are preferably positioned in non-critical sealing areas on the projection 22. The straight die draw section for this portion of the base end 38 of the projection 22 ensures a good seal between the projection 22 and the hose 10.

The subject invention provides a serviceable connector assembly 16 that eliminates the need for barbs formed on the projection by utilizing a locking cap 50 that rotates. The locking cap 50 also cooperates with the hose end 18 and projection 22 to provide a leak-free seal between the hose 10 and air induction component 20. Although a preferred embodiment of this invention has been disclosed, a worker of ordinary skill in this art would recognize that certain modifications would come within the scope of this invention. For that reason, the following claims should be studied to determine the true scope and content of this invention.

The invention claimed is:

1. A connector assembly for a vehicle component comprising:
    a first vehicle component having a main body with at least one transversely extending projection defining a longitudinal axis;
    a second vehicle component having a longitudinally extending bore slidably received over said projection to define an overlap connection portion;
    a retention member substantially surrounding said overlap connection portion and engaging said second vehicle component wherein said retention member is movable between an unlocked position where linear movement of said second vehicle component relative to said first vehicle component along said longitudinal axis is permitted and a locked position where linear movement of said second vehicle component relative to said first vehicle component along said longitudinal axis is prohibited, said retention member comprising a locking cap that is rotatable about said longitudinal axis relative to said first vehicle component to move between said unlocked and locked positions; and
    said projection including at least one post extending radially outwardly relative to said longitudinal axis and said locking cap including at least one slot for receiving said post wherein said locking cap includes a central bore extending from an inner end positioned adjacent to said main body of said first vehicle component to an outer end wherein said central bore has a greater diameter at said inner end than said outer end.

2. A connector assembly according to claim 1 wherein said central bore includes a longitudinally extending angled ramp portion at said outer end and wherein said ramp portion exerts a longitudinal force against said second vehicle component when said locking cap is in said locked position.

3. A connector assembly according to claim 2 wherein said second vehicle component comprises a hose.

4. A connector assembly according to claim 3 wherein said first vehicle component comprises an air induction component with said projection and post being integrally formed with said main body as one piece.

5. A connector assembly according to claim 3 wherein said first vehicle component comprises an intake manifold with said projection and post being integrally formed with said main body as one piece.

6. A connector assembly for a vehicle component comprising:
    a vehicle component having a main body with at least one transversely extending projection defining a longitudinal axis;
    a hose having an outer surface and an inner surface defining a longitudinally extending bore wherein one hose end is slidably received over said projection; and
    a locking cap having a central bore extending from an inner end positioned adjacent to said main body to an outer end wherein said hose end is received within said central bore and cooperates with said projection to align and lock said hose end to said vehicle component wherein said locking cap is rotatable relative to said hose end about said longitudinal axis between an unlocked position where linear movement of said hose relative to said projection along said longitudinal axis is permitted and a locked position where linear movement of said hose relative to said projection along said longitudinal axis is prohibited, and wherein said central bore has a minimum diameter at said outer end and a maximum diameter at said inner end that is greater than said minimum diameter.

7. An assembly according to claim 6 wherein said central bore includes a longitudinally extending ramp portion at said outer end that exerts a longitudinal force against said outer surface of said hose end when said locking cap is in said locked position.

8. A connector assembly for a vehicle component comprising:
   a first vehicle component having a main body with at least one transversely extending projection defining a longitudinal axis;
   a second vehicle component having a longitudinally extending bore slidably received over said projection to define an overlap connection portion; and
   a retention member substantially surrounding said overlap connection portion and engaging said second vehicle component wherein said retention member is movable between an unlocked position where linear movement of said second vehicle component relative to said first vehicle component along said longitudinal axis is permitted and a locked position where linear movement of said second vehicle component relative to said first vehicle component along said longitudinal axis is prohibited, said retention member comprising a locking cap that is rotatable about said longitudinal axis relative to said first vehicle component to move between said unlocked and locked positions; and
   said projection including at least one post extending radially outwardly relative to said longitudinal axis and said locking cap including at least one slot for receiving said post wherein said post extends radially outward from said slot beyond an outer surface of said locking cap.

* * * * *